(12) United States Patent
Tobin et al.

(10) Patent No.: US 10,584,676 B2
(45) Date of Patent: Mar. 10, 2020

(54) WIND TURBINE ROTOR BLADE ASSEMBLY WITH SURFACE FEATURES

(71) Applicant: General Electric Company, Schenectady, NY (US)

(72) Inventors: James Robert Tobin, Simpsonville, SC (US); Scott Gabell Riddell, Greer, SC (US); Michael Christopher Booth, Simpsonville, SC (US); Megan Michela Wilson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 461 days.

(21) Appl. No.: 15/396,919

(22) Filed: Jan. 3, 2017

(65) Prior Publication Data

US 2017/0107969 A1 Apr. 20, 2017

Related U.S. Application Data

(63) Continuation of application No. 13/886,348, filed on May 3, 2013, now Pat. No. 9,562,513.

(51) Int. Cl.
*F03D 1/06* (2006.01)

(52) U.S. Cl.
CPC ......... *F03D 1/0633* (2013.01); *F03D 1/0675* (2013.01); *F05B 2240/122* (2013.01); *F05B 2240/221* (2013.01); *F05B 2240/30* (2013.01); *F05B 2240/32* (2013.01); *F05B 2250/711* (2013.01); *F05B 2250/712* (2013.01); *F05B 2260/96* (2013.01); *F05B 2280/2003* (2013.01); *F05B 2280/4004* (2013.01); *Y02E 10/721* (2013.01); *Y02E 10/726* (2013.01)

(58) Field of Classification Search
CPC .... F03D 1/0633; F03D 1/0675; F03D 1/0608; F03D 1/065; F03D 1/0641; F03D 1/0683; F05B 2240/122; F05B 2240/30; F05B 2260/96; Y02E 10/721
See application file for complete search history.

(56) References Cited

U.S. PATENT DOCUMENTS

| 7,909,576 B1* | 3/2011 | van der Bos | ......... F03D 1/0675 416/146 R |
| 8,047,804 B2* | 11/2011 | Bagepalli | ................ E04H 12/08 416/244 A |
| 9,458,821 B2* | 10/2016 | Jacobsen | ................... F03D 1/06 |
| 2009/0087314 A1* | 4/2009 | Haag | ..................... F03D 1/0633 416/147 |

(Continued)

*Primary Examiner* — Dwayne J White
*Assistant Examiner* — Adam W Brown
(74) *Attorney, Agent, or Firm* — Dority & Manning, P.A.

(57) ABSTRACT

Rotor blade assemblies for wind turbines are provided. A rotor blade assembly includes a rotor blade. In some embodiments, the rotor blade assembly further includes a surface feature configured on an exterior surface of the rotor blade, the surface feature having an exterior mounting surface. At least a portion of the exterior mounting surface has a contour in an uninstalled state that is different from a curvature of the exterior surface of the rotor blade at a mount location of the surface feature on the rotor blade. In other embodiments, the rotor blade assembly further includes a seal member surrounding at least a portion of a perimeter of the surface feature. The seal member contacts and provides a transition between the exterior surface and the surface feature.

16 Claims, 8 Drawing Sheets

(56) References Cited

U.S. PATENT DOCUMENTS

2012/0201690 A1\* 8/2012 Fuglsang .............. F03D 1/0675
　　　　　　　　　　　　　　　　　　　416/235
2012/0257977 A1\* 10/2012 Jensen ................. F03D 1/0608
　　　　　　　　　　　　　　　　　　　416/223 R
2013/0156593 A1\* 6/2013 Gupta ................... F03D 1/0633
　　　　　　　　　　　　　　　　　　　416/235

\* cited by examiner

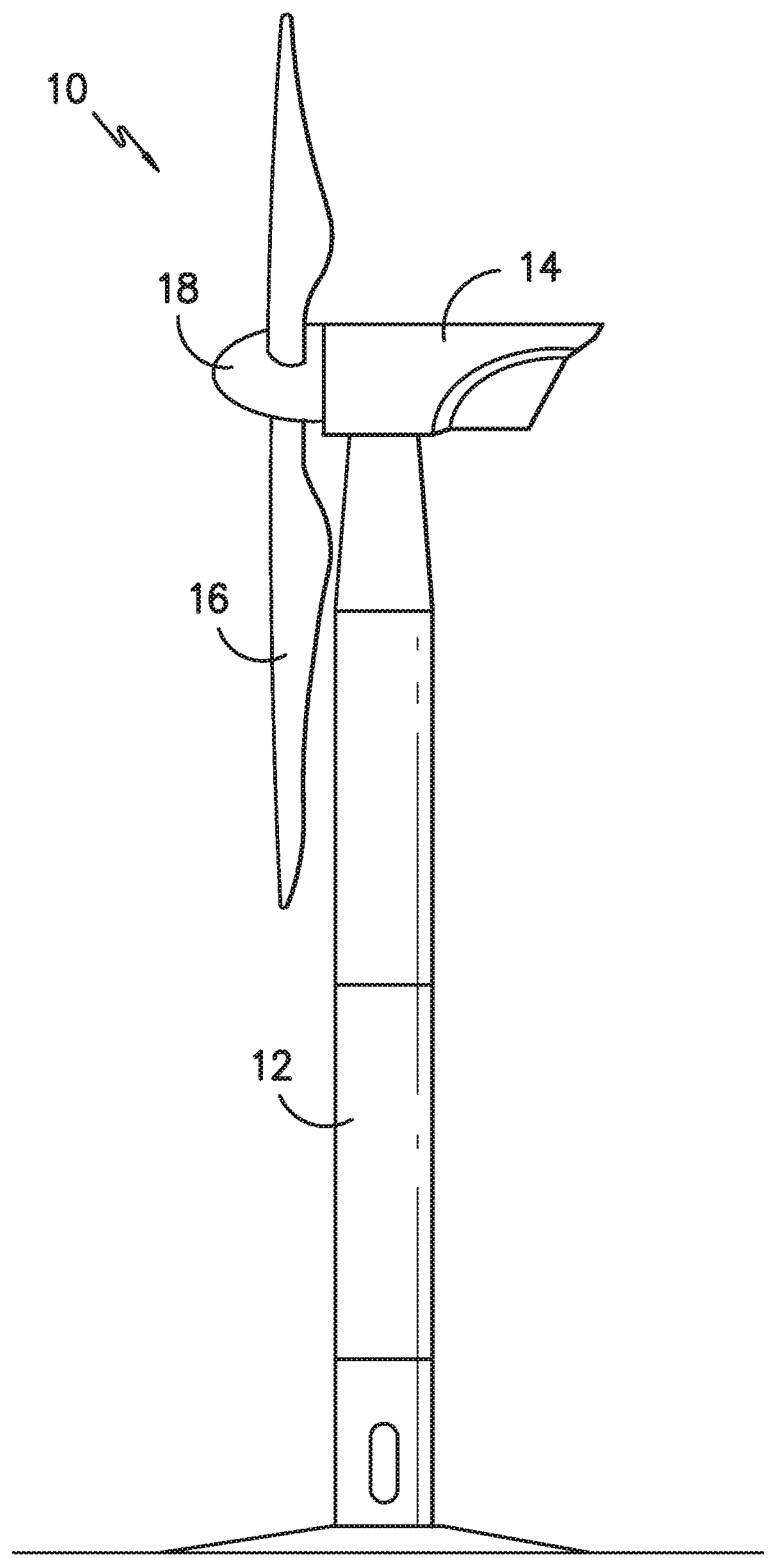
FIG. -1-

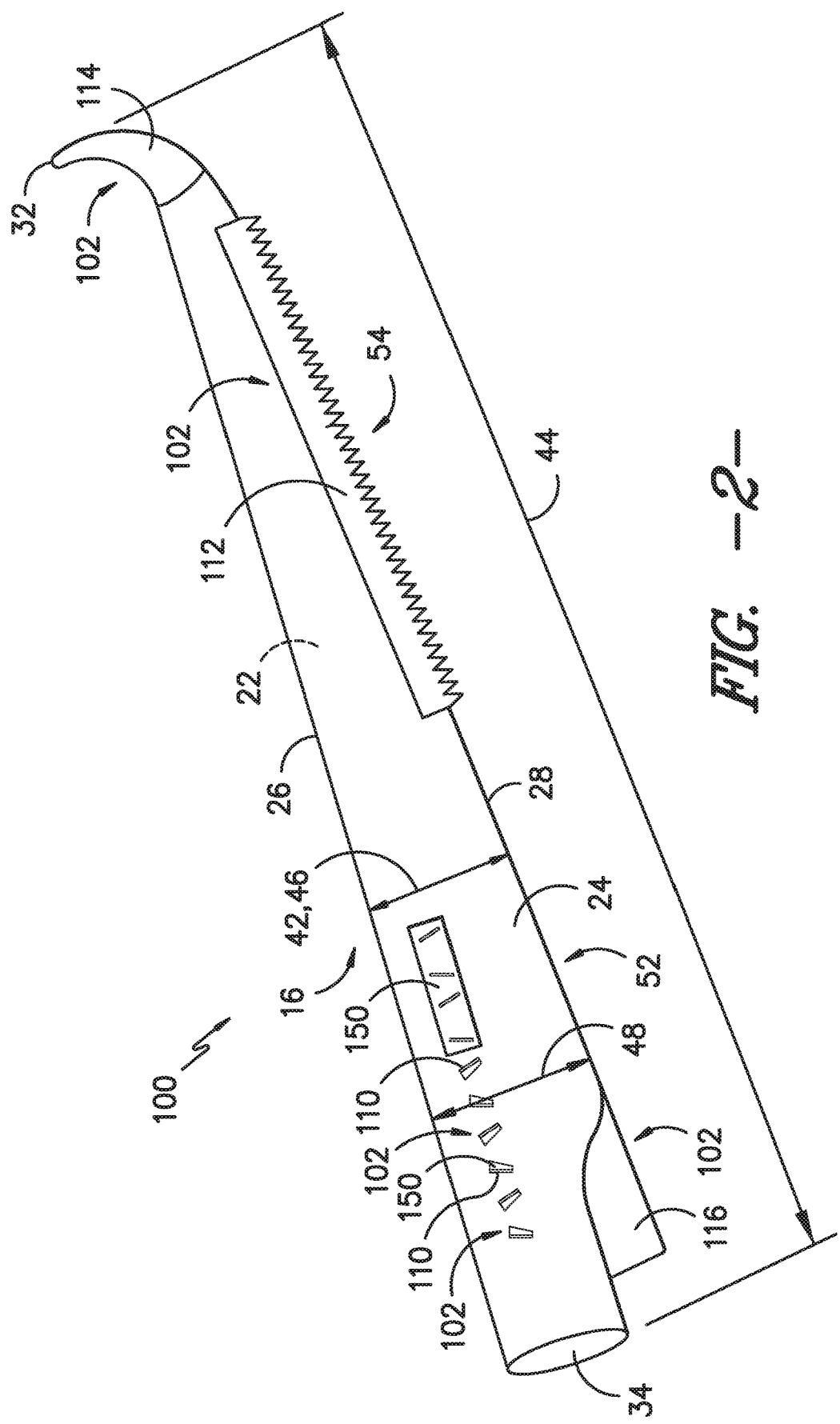
FIG. -2-

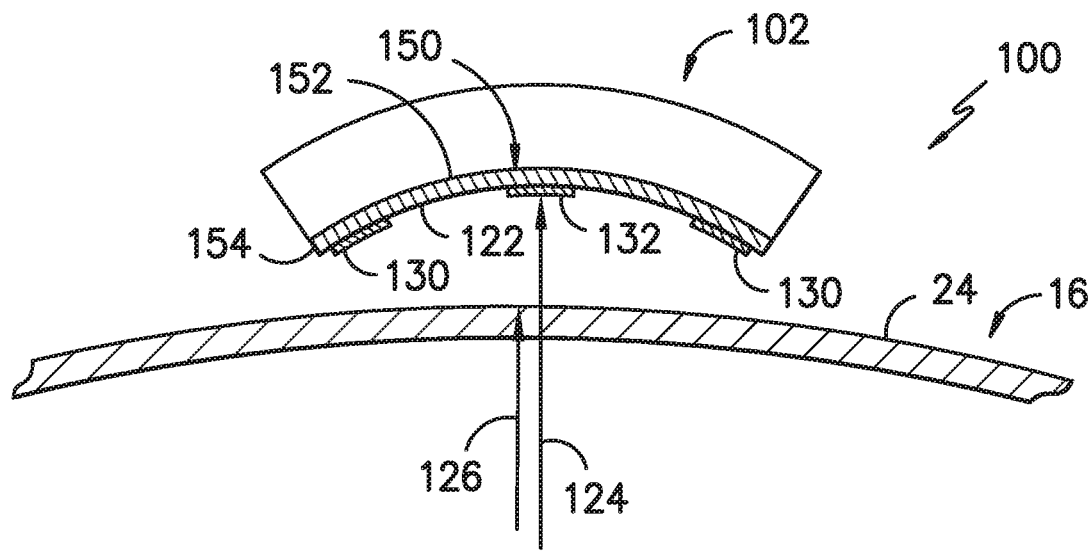
FIG. -3-
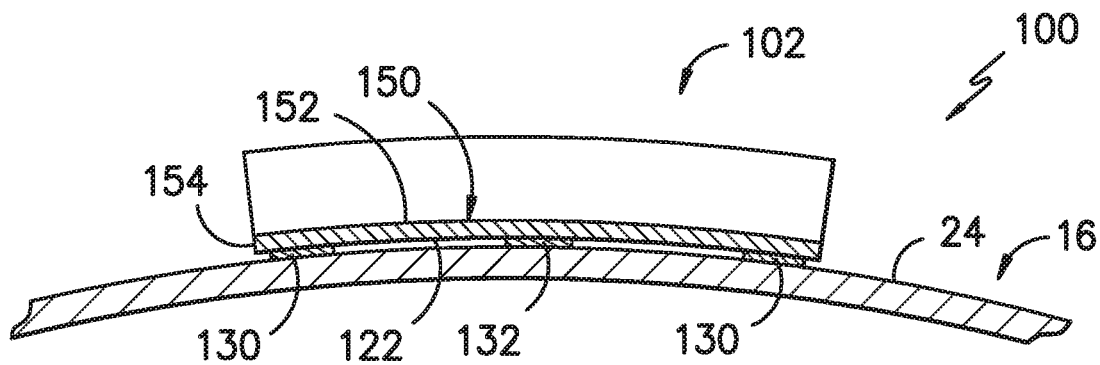
FIG. -4-

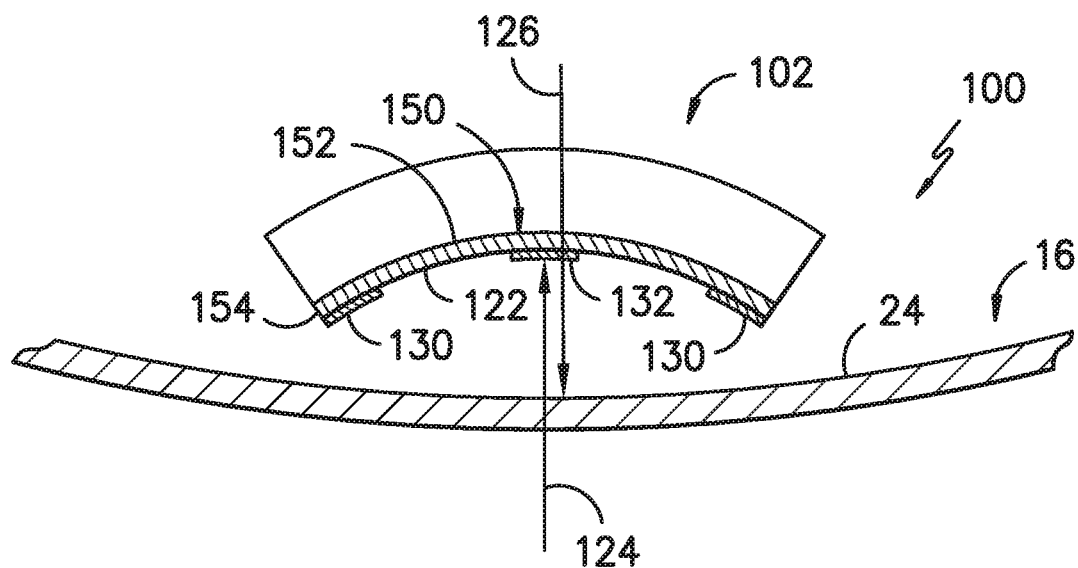
FIG. -5-
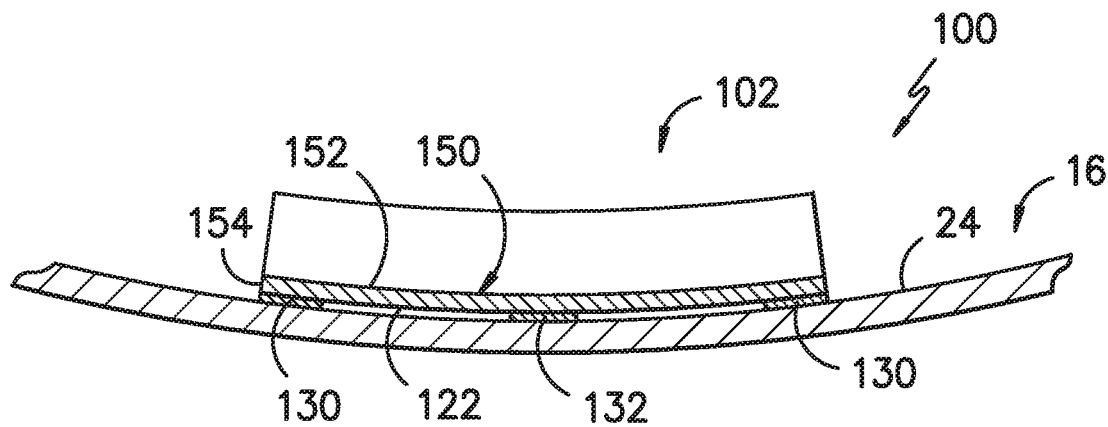
FIG. -6-

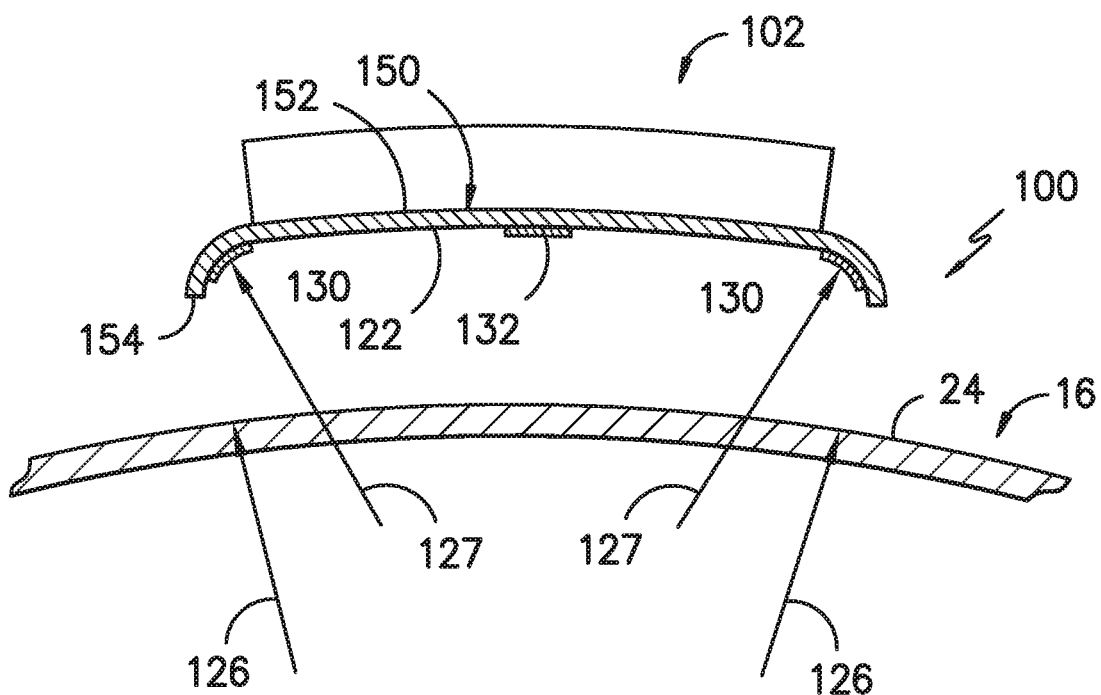
FIG. -7-
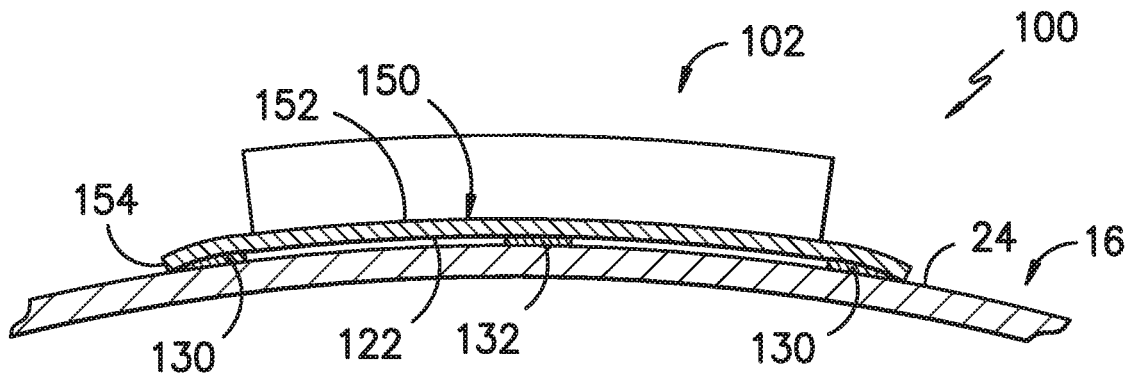
FIG. -8-

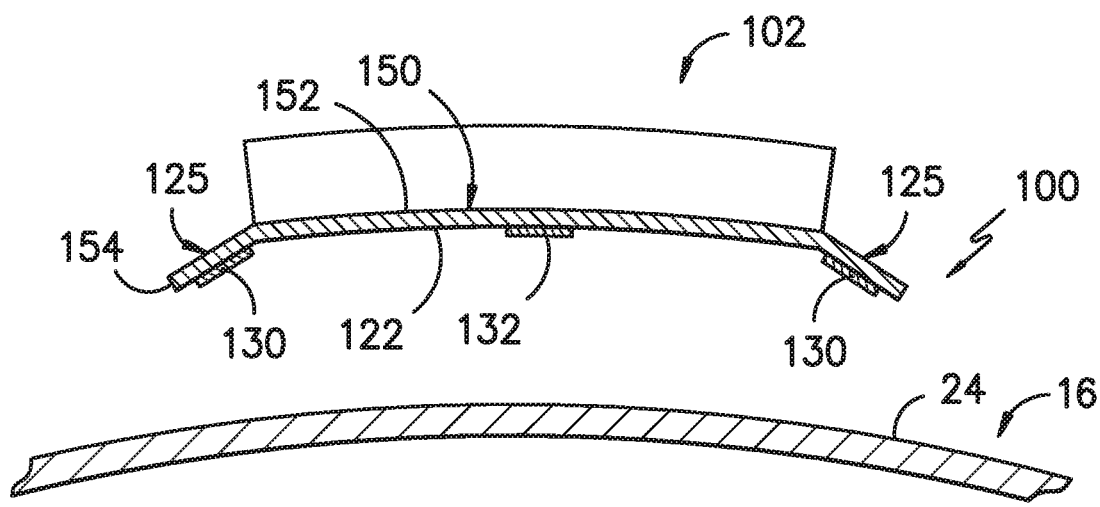
FIG. -9-
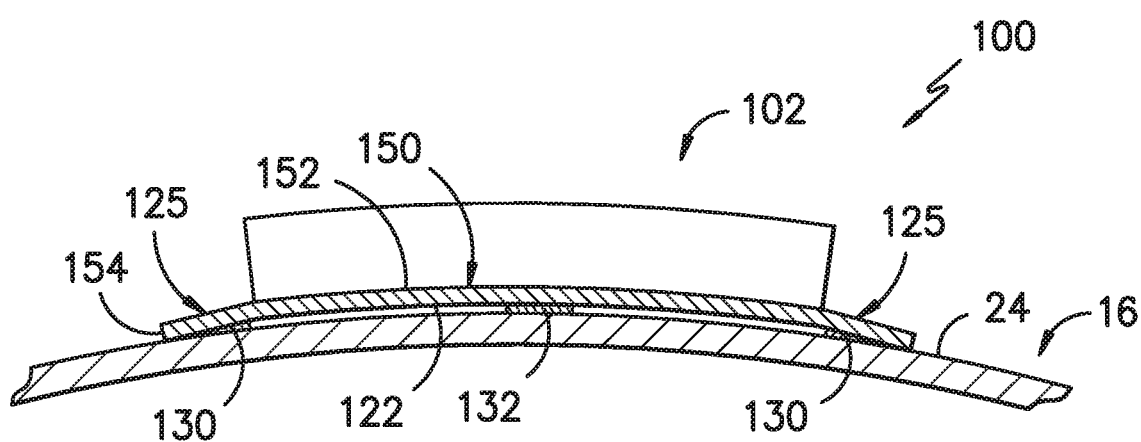
FIG. -10-

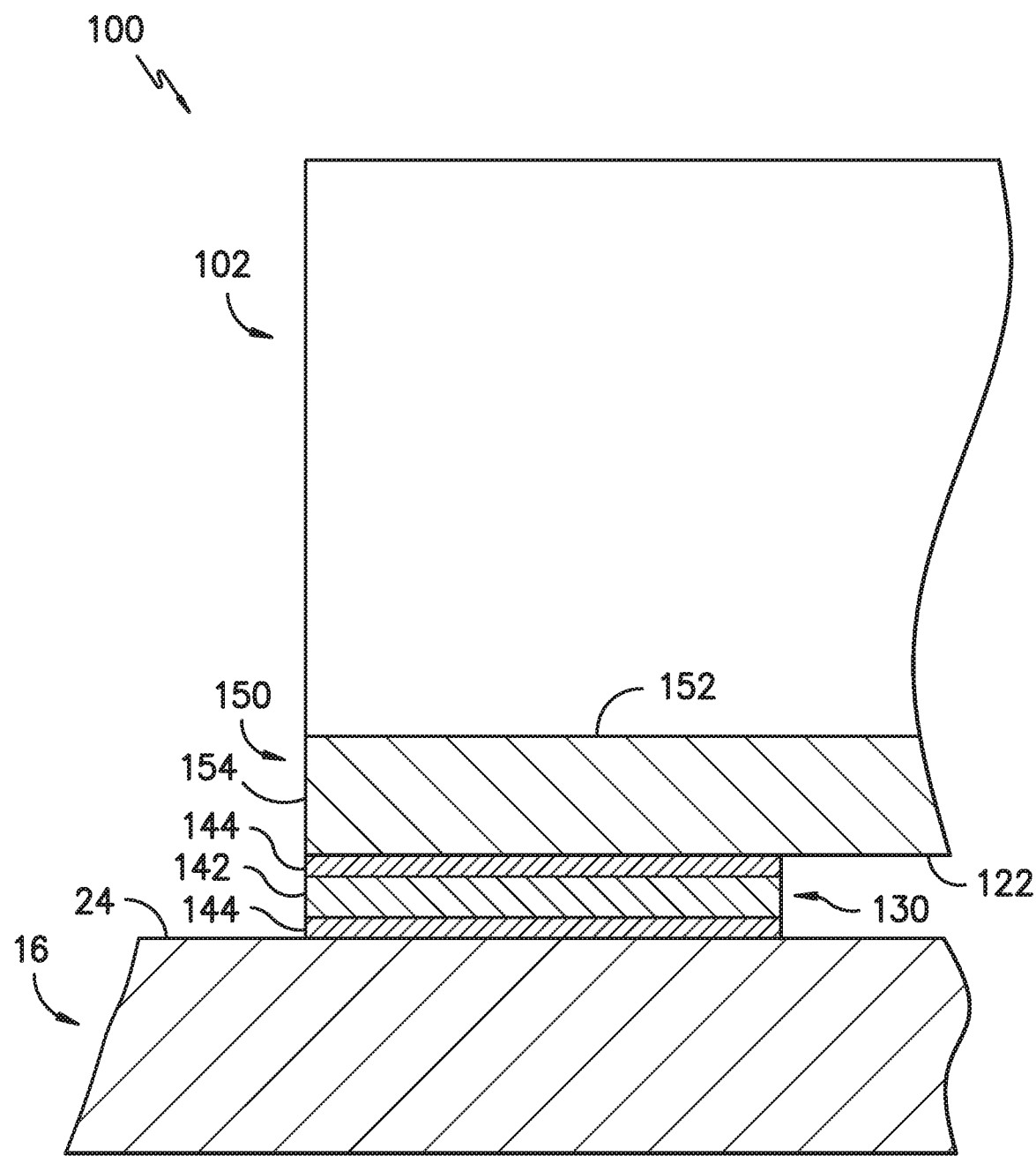
FIG. -11-

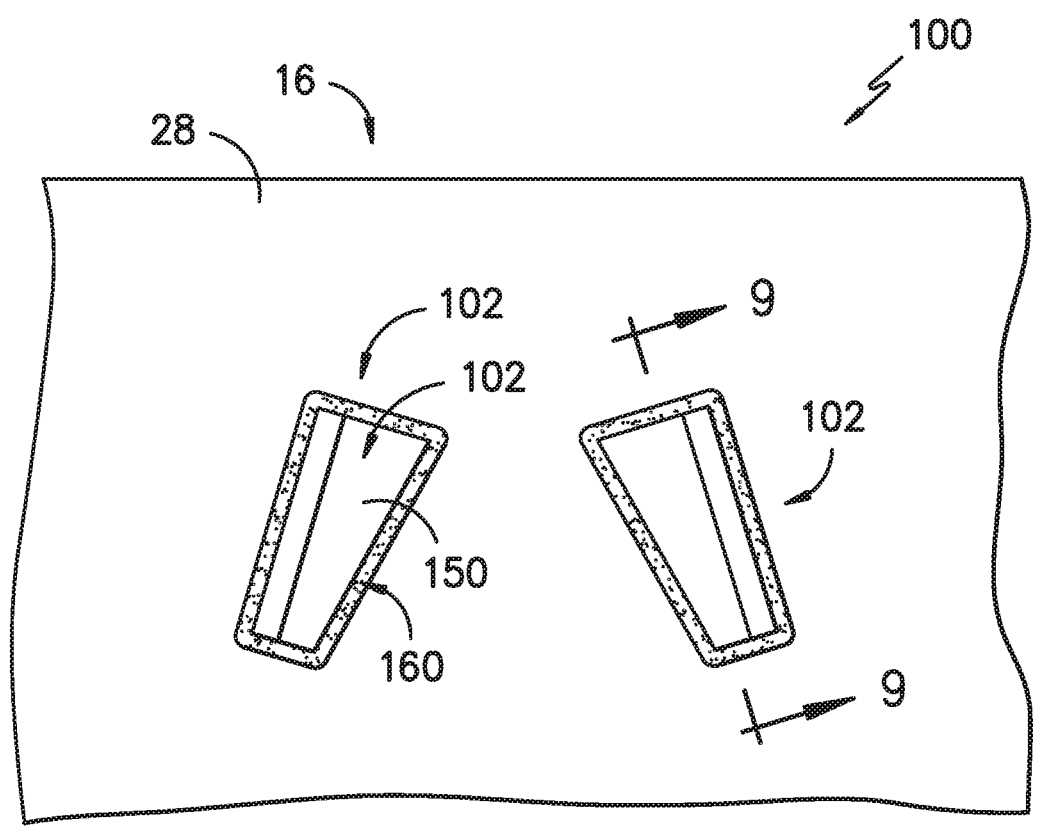
FIG. -12-
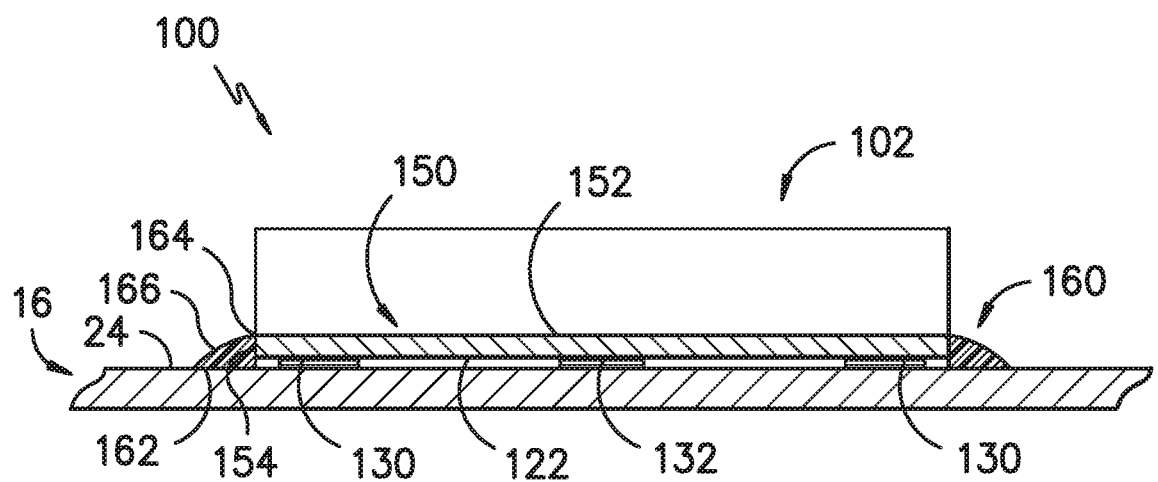
FIG. -13-

WIND TURBINE ROTOR BLADE ASSEMBLY WITH SURFACE FEATURES

RELATED APPLICATION

The present application is a Continuation Application of U.S. application Ser. No. 13/886,348, filed May 3, 2013.

FIELD OF THE INVENTION

The present disclosure relates in general to wind turbines, and more specifically to rotor blade assemblies therefor which include various surface features.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Rotor blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to the generator for producing electricity.

Various surface features may be provided on the exterior surfaces of a rotor blade in order to modify flow characteristics, lift characteristics, etc. of the rotor blade. For example, vortex generators may be utilized to reduce flow separation during operation of a rotor blade. Noise reducers may be utilized to reduce noise generated by the wind flow over and away from a rotor blade. Winglets may be utilized to increase lift at the tip of a rotor blade. Root enhancers may be utilized to increase lift at the root of a rotor blade.

Such surface features are mounted to rotor blades using various mounting techniques or apparatus. Conventionally known mounting techniques and apparatus may, however, have various disadvantages. For example, in some cases, conventional mounting may not adequately mount the surface features at their perimeter edges to the rotor blades. This can cause debris, such as dirt, moisture, etc. to become embedded between the surface feature and rotor blade, potentially damaging both the surface feature and rotor blade and/or causing further separation of the surface feature and rotor blade. Further, conventionally known mounting techniques do not provide a transition, and rather provide an abrupt step, between the exterior surface of the rotor blade and the surface feature. Thus, the use of such surface features may result in aerodynamic performance and efficiency losses.

Accordingly, improved rotor blade assemblies are desired in the art. In particular, rotor blades having improved bonding and sealing features would be advantageous.

BRIEF DESCRIPTION OF THE INVENTION

Aspects and advantages of the invention will be set forth in part in the following description, or may be obvious from the description, or may be learned through practice of the invention.

In one embodiment, a rotor blade assembly for a wind turbine is disclosed. The rotor blade assembly includes a rotor blade having exterior surfaces defining a pressure side, a suction side, a leading edge, and a trailing edge each extending between a tip and a root. The rotor blade further defines a span and a chord. The rotor blade assembly further includes a surface feature configured on an exterior surface of the rotor blade, the surface feature having an exterior mounting surface. At least a portion of the exterior mounting surface has a contour in an uninstalled state that is different from a contour of the exterior surface of the rotor blade at a mount location of the surface feature on the rotor blade.

In another embodiment, a rotor blade assembly for a wind turbine is disclosed. The rotor blade assembly includes a rotor blade having exterior surfaces defining a pressure side, a suction side, a leading edge, and a trailing edge each extending between a tip and a root. The rotor blade further defines a span and a chord. The rotor blade assembly further includes a seal member surrounding at least a portion of a perimeter of the surface feature. The seal member contacts and provides a transition between the exterior surface and the surface feature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a wind turbine according to one embodiment of the present disclosure;

FIG. 2 is a top view of a rotor blade assembly according to one embodiment of the present disclosure;

FIG. 3 is a cross-sectional view of a surface feature, in an uninstalled state, and a rotor blade according to one embodiment of the present disclosure;

FIG. 4 is a cross-sectional view of a surface feature in an installed state on a rotor blade according to one embodiment of the present disclosure;

FIG. 5 is a cross-sectional view of a surface feature, in an uninstalled state, and a rotor blade according to another embodiment of the present disclosure;

FIG. 6 is a cross-sectional view of a surface feature in an installed state on a rotor blade according to another embodiment of the present disclosure;

FIG. 7 is a cross-sectional view of a surface feature, in an uninstalled state, and a rotor blade according to another embodiment of the present disclosure;

FIG. 8 is a cross-sectional view of a surface feature in an installed state on a rotor blade according to another embodiment of the present disclosure;

FIG. 9 is a cross-sectional view of a surface feature, in an uninstalled state, and a rotor blade according to another embodiment of the present disclosure;

FIG. 10 is a cross-sectional view of a surface feature in an installed state on a rotor blade according to another embodiment of the present disclosure;

FIG. 11 is a close-up cross-sectional view of a surface feature in an installed state on a rotor blade according to one embodiment of the present disclosure;

FIG. 12 is a top view of a plurality of surface features configured on a rotor blade according to one embodiment of the present disclosure; and FIG. 13 is a cross-sectional view of a surface feature configured on a rotor blade according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring now to FIG. 2, a rotor blade 16 according to the present disclosure may include exterior surfaces defining a pressure side 22 and a suction side 24 extending between a leading edge 26 and a trailing edge 28. These surfaces may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIG. 2, the chord 42 may vary throughout the span 44 of the rotor blade 16. Thus, a local chord 46 may be defined for the rotor blade 16 at any point on the rotor blade 16 along the span 44. Further, a maximum chord 48 may be defined at a predetermined span-wise location on the rotor blade 16.

Additionally, the rotor blade 16 may define an inboard area 52 and an outboard area 54. The inboard area 52 may be a span-wise portion of the rotor blade 16 extending from the root 34. For example, the inboard area 52 may, in some embodiments, include approximately 25%, 33%, 40%, 50%, 60%, 67%, 75% or any percentage or range of percentages therebetween, or any other suitable percentage or range of percentages, of the span 44 from the root 34. The outboard area 54 may be a span-wise portion of the rotor blade 16 extending from the tip 32, and may in some embodiments include the remaining portion of the rotor blade 16 between the inboard area 52 and the tip 32. Additionally or alternatively, the outboard area 54 may, in some embodiments, include approximately 25% 33%, 40%, 50%, 60%, 67%, 75% or any percentage or range of percentages therebetween, or any other suitable percentage or range of percentages, of the span 44 from the tip 32.

As illustrated in FIGS. 2 through 13, the present disclosure may further be directed to one or more rotor blade assemblies 100. A rotor blade assembly 100 according to the present disclosure generally includes a rotor blade 16. Further, a rotor blade assembly 100 includes one or more surface features 102. Each surface feature 102 is configured on a surface of the rotor blade 16. A surface feature 102 is generally a component added to a surface of the rotor blade 16 to modify flow characteristics, lift characteristics, etc. of the rotor blade 16. For example, a surface feature may be a vortex generator 110. A plurality of vortex generators 110 are illustrated configured on the suction side of the rotor blade 16. Vortex generators 110 may be utilized to reduce flow separation during operation of a rotor blade 16. In some embodiments, a vortex generator 110 may be generally fin-like, as shown. Alternatively, a vortex generator 110 may have any suitable shape.

Additionally or alternatively, a surface feature 102 may be a noise reducer 112. A noise reducer 112 is illustrated configured on the suction side 24 and extending from the trailing edge 28 of the rotor blade 16. Noise reducers 112 may be utilized to reduce noise generated by the wind flow over and away from a rotor blade 16. In some embodiments, a noise reducer 112 may include a plurality of serrations, as shown. Additionally or alternatively, a noise reducer 112 may include a plurality of bristles, or have any other suitable shape and/or configuration.

Further, a surface feature 102 may be a winglet 114. A winglet 114 is illustrated configured on the pressure side 22, suction side 24, leading edge 26, and trailing edge 28 of the rotor blade 16, and further in the embodiment illustrated defines the tip 32 of the rotor blade 16. Winglets 114 may be utilized to increase lift at the tip 32 of a rotor blade 16.

Still further, a surface feature 102 may be a root enhancer 116 or other suitable chord extension apparatus. A root enhancer 116 is illustrated configured on the pressure side 22, suction side 24, and trailing edge 28 of the rotor blade 16, and is disposed proximate the root 34. Root enhancers 116 may be utilized to increase lift at the root 34 of a rotor blade 16.

It should be understood that the present disclosure is not limited to the above disclosed surface features 102. Rather, any suitable device or apparatus configured on a surface of a rotor blade 16 is within the scope and spirit of the present disclosure.

Referring now to FIGS. 3 through 13, various features and apparatus are provided for mounting a surface feature 102 to a rotor blade 16, and specifically to an exterior surface thereof. It should be understood that while these figures illustrate vortex generators 110 being mounted to rotor blades 16, these surface feature 102 embodiments are being illustrated for illustrative purposes only. The mounting features and apparatus disclosed herein similarly apply to any suitable surface feature 102.

Referring now to FIGS. 3 through 10, various mounting arrangements are illustrated for surface features 102 configured on exterior surfaces of rotor blades 16. FIGS. 3, 5, 7 and 9 illustrate surface features 102 in uninstalled states, while FIGS. 4, 6, 8 and 10 illustrate surface features 102 in installed states. In an uninstalled state, a surface feature 102 is generally not flexed or otherwise manipulated, while in an installed state, the surface feature 102 may be flexed or otherwise manipulated into position on the rotor blade 16. As shown, a surface feature 102 may include an exterior mounting surface 122, which is generally a surface to be mounted to an exterior surface of the rotor blade 16, such as the suction side 24 as illustrated or another suitable surface. The exterior mounting surface 122 may have a contour. Such contour may include, for example, a radius of curvature 124 and/or generally linear portion 125. The exterior surface, such as the suction side 24 as illustrated or another suitable surface, may additionally have a contour, such as a radius of curvature 126 or angle (not shown). In exemplary embodiments, as shown in FIGS. 3, 5, 7 and 9, at least a portion of the contour of the exterior mounting surface 122 when in the uninstalled state may be different from the contour of the exterior surface at the mounting location of the surface feature 102 on the rotor blade 16. In other words, at least a portion of the contour of the exterior mounting surface 122 may not match the contour of the exterior surface to which that portion is to be mounted.

Such differential between the contours may advantageously facilitate improved connection between the surface feature 102 and the rotor blade 16, particularly at the periphery of the surface feature 102. For example, when a surface feature 102 is mounted to the rotor blade 16, the surface feature 102 may be flexed or otherwise manipulated from the uninstalled state to the installed state, as illustrated for example in FIGS. 4, 6, 8 and 10. This allows portions of the surface feature 102 other than at the periphery to be mounted to the rotor blade 16. Such flexing or otherwise manipulating may advantageously cause opposing forces to be generated by the surface feature 102 generally at the periphery, such that when the surface feature 102 is mounted to the rotor blade 16, the connection at the periphery is advantageously improved.

It should be noted that, in exemplary embodiments, the contour of the exterior mounting surface 122 in the uninstalled state and the contour of the exterior surface may be viewed and measured in an identical cross-sectional view, such as those views illustrated in FIGS. 3 and 5.

In some embodiments, as shown in FIGS. 3 through 8, the contour of the exterior mounting surface 122 includes a radius of curvature 124. The radius of curvature 124 may be constant throughout the exterior mounting surface 122, such as in a cross-sectional view as shown, or may vary. FIGS. 3 and 5 illustrate generally constant radii of curvature 124 in uninstalled states. FIG. 7 illustrates, in an uninstalled state, a radius of curvature 124 with local varying portions 127, which in exemplary embodiments as shown are peripheral portions which may extend around the entire perimeter or any portion thereof. As discussed, at least a portion of the radius of curvature 124 of the exterior mounting surface 122, such as a local portion 127 or the entire radius of curvature 124, when in the uninstalled state may be different from the contour of the exterior surface at the mounting location of the surface feature 102 on the rotor blade 16. Thus, a local portion 127 may be different from that of the exterior surface at the location to which the local portion 127 is to be mounted, or the entire radius of curvature 124 may be different from that of the exterior surface 124 at the location to which the exterior mounting surface 122 is to be mounted.

In some embodiments, the radius of curvature 124, 127 of the exterior mounting surface 122 in the uninstalled state may be less than the radius of curvature 126 of the exterior surface, as shown in FIGS. 3 and 7. In other embodiments, the radius of curvature 124, 127 of the exterior mounting surface 122 in the uninstalled state may be greater than the radius of curvature 126 of the exterior surface, as shown in FIG. 5. Further, in some embodiments, both the exterior mounting surface 122 in the uninstalled state and the exterior surface may be convex, as shown in FIGS. 3 and 7. In other embodiments, both the exterior mounting surface 122 in the uninstalled state and the exterior surface may be concave. In still other embodiment, the exterior mounting surface 122 in the uninstalled state may be convex while the exterior surface is concave, as shown in FIG. 5, or the exterior mounting surface 122 in the uninstalled state may be concave while the exterior surface is convex.

Further, it should be understood that for purposes of the present disclosure, a numerical radius of curvature for a convex curve is considered different from an identical numerical radius of curvature for a concave curve.

In other embodiments, as shown in FIGS. 9 and 10, the contour of the exterior mounting surface 122 includes one or more generally linear portions 125. The generally linear portions 125 may, for example and as shown, be local generally linear portions, which in exemplary embodiments as shown are peripheral portions which may extend around the entire perimeter or any portion thereof. Alternatively, the entire exterior mounting surface 122 may be linear when viewed cross-sectionally. The linear portions 125 may, for example, extend at suitable angles as required for mounting to the rotor blade 16. As discussed, the generally linear portions 125 of the exterior mounting surface 122 when in the uninstalled state may be different from the contour of the exterior surface at the mounting location of the surface feature 102 on the rotor blade 16. For example, the exterior surface at the mounting location may be curvilinear, as shown, or may be linear having a different angle. Thus, a generally linear portion 125 may be different from that of the exterior surface at the location to which the generally linear portion 125 is to be mounted.

A plurality of attachment features may be utilized to connect a surface feature 102 to a rotor blade 16, as illustrated for example, in FIGS. 3 through 11 and 13. The plurality of attachment features may include, for example, one or more first attachment features 130 located proximate the perimeter of the surface feature 102, such as at or slightly spaced from the perimeter, and one or more second attachment features 132 spaced from the perimeter of the surface feature 102 relative to the first attachment features 130. In other words, the second attachment features 132 may be farther from the perimeter than the first attachment features 130. It should be noted that a first attachment feature 130 may extend about the entire periphery of the surface feature 102, or multiple first attachment features 132 may be utilized at various locations about the periphery. In some embodiments, an attachment feature may be, for example, a mechanical fastener, such as a screw, nail, rivet, nut-bolt combination, etc. In other exemplary embodiments, an attachment feature may be a bond media, as shown. The bond media may be disposed between the exterior mounting surface 122 and the exterior surface, and may bond the surface feature 102 to the rotor blade 16.

In exemplary embodiments, a bond media according to the present disclosure may have various characteristics for reducing the strain associated with mounting the surface feature 102 to the rotor blade 16. The bond media may thus at least partially absorb strain from the rotor blade 16 and prevent this strain from being transmitted to the surface feature 102. The bond media may thus generally be formed from materials that are relatively flexible and relatively tough. In exemplary embodiments, the bond media may generally isolate the strain associated with the rotor blade 16. By generally isolating the strain, the bond media may generally prevent a relatively substantial portion of the rotor blade 16 strain from being transmitted through the bond media to the surface feature 102.

In exemplary embodiments, for example, the bond media may be relatively elastic, and may thus have a relatively low shear modulus. The shear modulus may be determined over suitable environmental conditions or ranges of environmental conditions generally expected for a wind turbine 10. For example, in some embodiments, the shear modulus of the bond media may be approximately equal to or less than 500 megapascals.

In some embodiments, the bond media may comprise an epoxy. In other embodiments, the bond media may comprise a polyurethane. In other embodiments, the bond media may comprise a methacrylate, such as methyl methacrylate. In yet other exemplary embodiments, the bond media may include an acrylic.

FIG. 11 illustrates one exemplary embodiment of the bond media according to the present disclosure. In this embodiment, the bond media may comprise an inner layer 142 and a plurality of outer layers 144. The inner layer 142 is disposed between the opposing outer layers 144. The inner layer 142 may comprise, for example, an epoxy, a polyurethane, a methacrylate, or an acrylic. In exemplary embodiments, the inner layer 142 is an acrylic foam. Further, the acrylic foam may be a closed cell acrylic foam. The outer layers 144 may generally be configured to mount the surface feature 102 to the rotor blade 16. In exemplary embodiments, the outer layers 144 comprise adhesives and are outer adhesive layers 144. For example, in some exemplary embodiments, the outer layers 144 may comprise acrylic adhesives.

As shown in FIGS. 2 through 13, a surface feature 102 or plurality of surface features 102 in exemplary embodiments may further include a base plate 150. The base plate 150 may be a lower portion of the surface feature 102 or surface features 102 that is mounted to the rotor blade 16. Thus, the base plate 150 may include the exterior mounting surface 122 for one or more surface features 102. The base plate 150 may further, for example, include an exterior opposing surface 152 and a peripheral edge 154. The peripheral edge 154 may define the periphery of the base plate 150 and surface feature 102 in general. FIGS. 2 and 9 illustrate base plates 150 utilized with single surface features 102, which as illustrated are vortex generators 110. FIG. 2 further illustrates a base plate 150 utilized with a plurality of surface features 102, such that the plurality of surface features 102 are mounting on and using a single base plate 150.

As illustrated in FIGS. 12 and 13, a seal member 160 may be provided to provide a seal between a surface feature 102 and the rotor blade 16. The seal member 160 may surround at least a portion of the perimeter of the surface feature 102, which may for example be defined by the peripheral edge 154 as discussed above. FIG. 12 illustrates a seal member 160 surrounding an entire perimeter of a surface feature 102. The seal member 160 may contact the exterior surface of the rotor blade 16, such as the suction side 24 or other suitable surface, and may contact the surface feature 102, such as the peripheral edge 154 or the perimeter generally. Further, the seal member 160 may provide a transition between the exterior surface and the surface feature 102. For example, as shown, the seal member 160 may provide a transition between the exterior surface and the exterior opposing surface 152 of the base plate 150. Such transition, by reducing or eliminating any abrupt step between the exterior surface and the surface feature 102, may advantageously increase the associated aerodynamic performance and efficiency of the surface feature 102, rotor blade assembly 100, and wind turbine 10 in general.

As shown, for example, a seal member 160 may include a base surface 162, a top surface 164, and an outer edge 166 extending therebetween. In exemplary embodiments, the outer edge 166 may be tapered between the base surface 162 and the top surface 164. Such tapering is illustrated in a cross-sectional view as shown, for example, in FIG. 13. Further, in such cross-sectional view, the outer edge 166 may be curvilinear as shown, linear, or have any other suitable path.

As discussed, the seal member 160 may provide a transition between the exterior surface and the exterior opposing surface 152. For example, as shown in FIG. 13, the outer edge 166 may taper towards the exterior opposing surface 152, thus providing a transition. Further, in exemplary embodiments, the top surface 164 may be generally flush with the exterior opposing surface 152.

It should be noted that a seal member 160 may be mounted to the exterior surface and/or the surface feature 102 through any suitable attachment features. For example, mechanical fasteners or bond media, as discussed above, may be utilized.

In exemplary embodiments, generally compliant materials may be advantageous for use in forming a seal member 160. For example, a seal member 160 may be formed from a rubber or silicon. Alternatively, however, any suitable material may be utilized to form a seal member 160.

It should be noted that, in addition to or as an alternative to the use of the seal member 160, one or more surfaces of a surface feature 102 may be chamfered or otherwise tapered to provide desired transitional aerodynamic improvements. Such tapering may include, for example, radiusing, blending, and/or any other suitable linear, curvilinear, and/or other modifications in the transition of the surface(s) of the surface feature 102. For example, a perimeter edge, or portion thereof, of a surface feature 102 may be chamfered or otherwise tapered. In some embodiments wherein a base plate 150 is utilized, the peripheral edge 154 or a portion thereof may be chamfered or otherwise tapered, for example from the exterior mounting surface 122 to the exterior opposing surface 152. For example, a forward portion of the peripheral edge 154, generally relatively closest to the leading edge 26, may be chamfered or otherwise tapered, or alternatively the entire peripheral edge 154 may be chamfered or otherwise tapered.

As discussed, rotor blade assemblies 100 and surface features 102 thereof according to the present disclosure advantageously include improved bonding and sealing features. For example, a surface feature 102 may include an exterior mounting surface 122 having a particularly advantageous contours relative to the exterior surface of the rotor blade 16 on which the surface feature is to be mounted. Further, seal members 160 may be utilized to seal and provide transitions between the rotor blade 16 and the surface features 102. Such improved bonding and sealing features may advantageously reduce the amount of debris embedded between the surface feature 102 and rotor blade 16. Further, the use of seal members 160 which provide transitions as discussed herein may advantageously improve the associated aerodynamic performance and efficiency of the surface feature 102, rotor blade assembly 100, and wind turbine 10 in general.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
    a rotor blade having exterior surfaces defining a pressure side, a suction side, a leading edge, and a trailing edge each extending between a tip and a root, the rotor blade further defining a span and a chord;
    a surface feature configured on an exterior surface of the rotor blade, the surface feature having an exterior mounting surface; and
    a plurality of attachment features positioned on the exterior mounting surface so as to secure the surface feature to the exterior surface of the rotor blade, the plurality of attachment features comprising a first attachment feature proximate to and extending about an entire periphery a of the surface feature and a separate, second attachment feature spaced from and within the periphery of the surface feature relative to the first attachment feature, the first and second attachment features comprising a bond media.

2. The rotor blade assembly of claim 1, wherein the exterior mounting surface comprises a contour with a radius of curvature in an uninstalled state less than a radius of curvature of a contour of the exterior surface of the rotor blade at a mount location of the surface feature on the rotor blade.

3. The rotor blade assembly of claim 2, wherein the radius of curvature of the exterior mounting surface is a local radius of curvature.

4. The rotor blade assembly of claim 2, wherein the contour of the exterior mounting surface comprises a local generally linear portion.

5. The rotor blade assembly of claim 2, wherein the exterior mounting surface in the uninstalled state and the exterior surface are concave.

6. The rotor blade assembly of claim 2, wherein the exterior mounting surface in the uninstalled state is concave and the exterior surface is convex.

7. The rotor blade assembly of claim 1, wherein the first attachment feature comprises an inner acrylic foam layer sandwiched between opposing outer adhesive layers and the second attachment feature comprises an adhesive.

8. The rotor blade assembly of claim 1, wherein the first attachment feature comprises an adhesive and the second attachment feature comprises an inner acrylic foam layer sandwiched between opposing outer adhesive layers.

9. The rotor blade assembly of claim 1, wherein the surface feature comprises a base plate, the base plate comprising the exterior mounting surface.

10. A rotor blade assembly for a wind turbine, the rotor blade assembly comprising:
    a rotor blade having exterior surfaces defining a pressure side, a suction side, a leading edge, and a trailing edge each extending between a tip and a root, the rotor blade further defining a span and a chord;
    a surface feature configured on an exterior surface of the rotor blade, the surface feature having an exterior mounting surface defining a periphery;
    at least one attachment feature positioned on the exterior mounting surface within the periphery and connecting the surface feature to the rotor blade, the at least one attachment feature being proximate to and extending about the periphery f the surface feature; and
    a seal member surrounding at least a portion of the periphery of the surface feature and the at least one attachment feature, the seal member contacting and providing a transition between the exterior surface and the surface feature.

11. The rotor blade assembly of claim 10, wherein the exterior mounting surface in an uninstalled state is concave and the exterior surface of the rotor blade is convex.

12. The rotor blade assembly of claim 10, wherein an outer edge of the seal member is tapered between a base surface and a top surface.

13. The rotor blade assembly of claim 10, wherein the seal member is formed from one of a rubber or a silicon.

14. The rotor blade assembly of claim 10, wherein the surface feature comprises a base plate, the base plate comprising an exterior mounting surface and an exterior opposing surface, and wherein the seal member provides a transition between the exterior surface of the rotor blade and the exterior opposing surface of the base plate.

15. The rotor blade assembly of claim 14, wherein a top surface of the seal member is generally flush with the exterior opposing surface of the base plate.

16. The rotor blade assembly of claim 10, wherein the seal member surrounds the entire periphery of the surface feature.

* * * * *